United States Patent Office 3,398,201
Patented Aug. 20, 1968

3,398,201
REACTION PRODUCTS FROM 2-ALKOXYBUTA-
NOLS AND 3,5,x - POLYALKOXYALKANOLS
WITH ALKYLENE OXIDES
Samuel A. Glickman, Easton, Pa., assignor to GAF
Corporation, a corporation of Delaware
No Drawing. Filed May 7, 1965, Ser. No. 454,205
4 Claims. (Cl. 260—615)

The present invention relates to reaction products of alkylene oxides, such as ethylene; propylene; or butyleneoxide with 3-alkoxy butanols and higher polyalkoxy alkanols containing alkoxy substituents on odd numbered carbon atoms of the type which may be obtained, for example, by the simultaneous hydrolysis-reduction of the alkoxy acetals described in Mueller-Conradi U.S. Patent 2,165,962, and Copenhaver U.S. Patent 2,487,525, by the process of U.S. Patent No. 2,618,663.

The reaction involved in the process of the present invention, as well as the general formula of the raw materials used and the novel products obtained, is shown in the following equation:

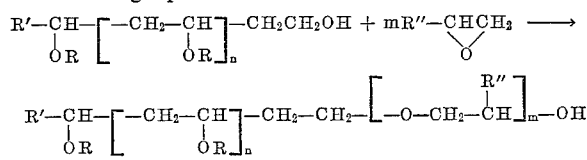

wherein R and R' may be the same or different hydrocarbon groups, selected from the group consisting of alkyl, aryl, alkoxy alkyl, or aralkyl, and preferably lower alkyl (1 to 4 carbon atoms); and $n$ is an integer, preferably 0 to 5, although products in which $m$ is higher (e.g. 15, 30 or higher) are readily obtainable and may be used; and R" is lower alkyl; e.g. methyl, ethyl, propyl or phenyl, and $m$ represents an integer, preferably 1 to 5, although higher values (e.g. up to 50 to 100) for $m$ are readily obtainable. In the case of mixtures of products, it will be understood that $m$ and $n$ in the foregoing formulae represent average values.

The ether alcohols obtained above are novel compounds which offer interesting possibilities in a wide variety of fields of application. It will be apparent, however, that their properties will vary with the nature of the starting alkoxy alcohol and the alkylene oxide as well as the ratio of alkylene oxide employed. The solvent applications are numerous and they may serve as effective replacements for the polyethylene glycols and lower glycols in uses where low hygroscopicity, wide solvent power and lower viscosity are of value. Utilization in the plasticization of photographic gelatin and the softening of casein and glue compositions is of interest. Advantage may be taken of the terminal hydroxyl group to prepare esters of various mono and polybasic acids such as stearic, adipic, phthalic, etc.

The reaction products of ethylene and propylene oxide with 3-methoxy-1-butanol have been particularly investigated with specific reference to the formulation of automotive hydraulic brake fluids. The ethyleneoxy derivatives gave very superior results, possessing a favorable viscosity-temperature relationship, excellent boiling points, relative inertness toward rubber and metals, compatibility with standard brake fluids and meet the other requisites of a foundation fluid for hydraulic liquids. The use of the propyleneoxy and butyleneoxy compounds, in a blend with the above, may be indicated by a consideration of its properties.

These products are readily obtained by processes known in the art for condensing alkylene oxides with organic hydroxy compounds, such as are disclosed, for example, in U.S.P. 1,970,578. The typical operating conditions in this reaction are the gradual addition of the alkylene oxide to the alkoxy alcohol, at a temperature in the range of 120 to 130° C., a pressure of 20 to 30 pounds per square gauge, and in the presence of a small amount of alkali, such as 0.3 to 0.5 percent sodium hydroxide, as a catalyst. These conditions are, in no way, to be construed to be limiting, since wide ranges in pressure and temperature catalyst concentration are also operative. For many purposes, the alkaline catalyst may be allowed to remain in the product, or may be neutralized and removed by treatment with acids, such as carbonic acid, phosphoric acid, acetic acid, etc. or by a simple ion exchange operation.

In order to fully illustrate the present invention, the following specific examples thereof are given:

Example 1

A mixture of 673 g. of 3-methoxy-1-butanol and 2.0 g. of sodium hydroxide was reacted with a total of 424 g. of ethylene oxide at 120° C. at 20–30 p.s.i., the addition requiring 2–3 hours. This constitutes a ratio of 1:1.5 of 3-methoxy-1-butanol to ethylene oxide.

A portion of the above pale-yellow material was subjected to cation exchange through a bed of ion-exchange resin of the polysulfonic acid type. The resulting neutral material had the following physical properties: $n_D^{25}$ 1.4344; $d_4^{25}$ 0.9923; percent OH of 9.91 indicating an average molecular weight of 172. The absolute viscosity at 40° F. was 350 cp. and at 130° F. was 3.45 cs.

The mixture was separated into its components by distillation. The following table contains data as to the series distribution, physical properties and elementary analysis.

| Structure | Wt. percent | B.P. | $n_D^{25}$ | $d_4^{25}$ | Analysis | | | |
|---|---|---|---|---|---|---|---|---|
| | | | | | Carbon | | Hydrogen | |
| | | | | | Calc. | Found | Calc. | Found |
| $CH_3CH(OCH_3)CH_2CH_2OH$ | 25.4 | | | | | | | |
| $CH_3CH(OCH_3)CH_2CH_2OCH_2CH_2OH$ | 18.3 | 130° C. at 13 mm | 1.4282 | 0.9682 | 56.71 | 56.89 | 10.88 | 10.78 |
| $CH_3CH(OCH_3)CH_2CH_2(OCH_2CH_2)_2OH$ | 17.5 | 90° C. at 1.0 mm | 1.4366 | 1.0006 | 56.20 | 56.24 | 10.48 | 10.45 |
| $CH_3CH(OCH_3)CH_2CH_2(OCH_2CH_2)_3OH$ | 15.5 | 105° C. at 0.1 mm | 1.4425 | 1.0228 | 55.90 | 55.94 | 10.23 | 10.24 |
| $CH_3CH(OCH_3)CH_2CH_2(OCH_2CH_2)_4OH$ | 7.2 | 130° C. at 0.15 mm | 1.4468 | 1.0380 | 55.68 | 55.69 | 10.07 | 9.90 |
| $CH_3CH(OCH_3)CH_2CH_2(OCH_2CH_2)_5OH$ | 5.4 | 155° C. at 0.15 mm | 1.4500 | | | | | |
| Higher members | 9.6 | | | | | | | |

A preferred, suggested nomenclature of the above compounds is the following:

| Structure | Name |
|---|---|
| (a) $CH_3-CH(OCH_3)CH_2CH_2-OCH_2CH_2OH$ | 2-(3-methoxybutoxy) ethanol. |
| (b) $CH_3-CH(OCH_3)CH_2CH_2(OCH_2CH_2)_2OH$ | 2-(3-methoxybutoxyethyleneoxy) ethanol. |
| (c) $CH_3-CH(OCH_3)CH_2CH_2(OCH_2CH_2)_3OH$ | 2-[3-methoxybutoxydi(ethyleneoxy)] ethanol. |
| (d) $CH_3-CH(OCH_3)CH_2CH_2(OCH_2CH_2)_nOH$ | Generic: 2-[3-methoxybutoxypoly (ethylenoxy)] ethanol. |

Alternative names for the above are respectively:

(a) 6-methyl-3,7-dioxa-1-octanol.
(b) 9-methyl-3,6,10-trioxa-1-hendecanol.
(c) 12-methyl-3,6,9,13-tetraoxa-1-tetradecanol.
(d) Generic: Methylpolyoxa-1-alkanol.

Example 2

A mixture of 658 g. of 3-methoxy-1-butanol and 2.6 g. of sodium hydroxide was reacted with a total of 446 g. of propylene oxide at 130° C. at 20–30 p.s.i., the addition requiring 2–3 hours. This constitutes a ratio of 1.0:1.18 or 3-methoxy-1-butanol to propylene oxide.

An aliquot of the above was subjected to cation exchange through a vertical column of ion-exchange resin (Amberlite IR–100 of the polysulfonic acid type). The resulting neutral material had the following physical properties: $n_D^{25}$ 1.4277; $d_4^{25}$ 0.9500; percent OH 10.20 (indicating an average molecular weight of 167). The absolute viscosity at −40° F. was 390 cp. and at 130° F. was 2.82 cs.

The mixture was resolved into its components by distillation. The following table contains data as to the distribution, physical properties and elementary analysis.

| Structure | Wt. percent | B.P. | $n_D^{25}$ | $d_4^{25}$ | Analysis | | | |
|---|---|---|---|---|---|---|---|---|
| | | | | | Carbon | | Hydrogen | |
| | | | | | Calc. | Found | Calc. | Found |
| CH₃CH(OCH₃)CH₂CH₂OH | 17.4 | | | | | | | |
| CH₃CH(OCH₃)CH₂CH₂OCH₂CH(CH₃)OH | 45.2 | 97° C. at 13 mm | 1.4252 | 0.9410 | 59.24 | 59.29 | 11.19 | 11.16 |
| CH₃CH(OCH₃)CH₂CH₂OCH₂CH(CH₃)₂OH | 23.2 | 90° C. at 1.2 mm | 1.4312 | 0.9579 | 59.86 | 59.89 | 10.98 | 11.00 |
| CH₃CH(OCH₃)CH₂CH₂OCH₂CH(CH₃)₃OH | 7.2 | 95–100° C. at 1.00 mm | 1.4357 | 0.9703 | 60.40 | 60.32 | 10.86 | 10.88 |
| High members | 6.3 | | | | | | | |

The first member of the series, with the structure, $$CH_3CH(OCH_3)-CH_2CH_2OCH_2CH(CH_3)OH$$

may be named 1-(3-methoxybutoxy)-2-propanol. The generic name is 1-[3-methoxybutoxypoly (propyleneoxy)]-2-propanol.

The above compounds are represented in the form of the leading component, although the presence of the isomeric primary alcohols in small amounts is probable. Thus, the first member of the series might be considered CH₃—CH(OCH₃)CH₂CH₂OCH(CH₃)CH₂OH.

As indicated in the foregoing, successive units of the alkylene oxide added on to the starting material and to the first members of the series, and when the products are produced, as described in the examples, a mixture of products is normally obtained, the bulk of the product being that in which the number of alkalenoxy groups in the polyglycol ether radicals approximates the number of moles of ethylene oxide employed per mole for starting alkoxy alcohol. For most purposes, these mixtures are quite satisfactory, and in fact may be preferred for certain applications, such as formulation of automotive and airplane hydraulic fluids, and formulation of plasticizers, etc. However, it is possible to obtain products having a quite uniform polyglycol ether group by condensing the starting alkoxy alcohol with a preformed polyglycol ether, in the manner also described in U.S. Patent 1,970,578.

For applications in which the water solubility of the final product is a desirable product, the number of moles of ethylene oxide employed for condensation with the alkoxy alcohol may be increased. Thus, derivatives in which several moles of ethylene oxide per mole of alkoxy alcohol are employed, show a substantial or complete degree of water solubility depending on the number of carbon atoms in the alkoxy alkenol. In general, in order to impart water solubility to the product, there should be employed approximately 1 mole of ethylene oxide for each two carbon atoms in the starting higher alkoxy alcohol.

It will also be apparent that the properties of the products of the present invention may be considerably varied by selection of the specific structure of the alkoxy alcohol used as a starting material; and, if desired, mixtures of alkoxy alcohols in which n, in the formula given above, represents an average value preferably within the range of from 1 to 5, may be employed.

The novel products of the present invention have been investigated to a substantial extent as automotive hydraulic brake fluids, and have been found to be useful for such purposes; and possess very desirable properties and advantages in regards to the requirements for the hydraulic foundation fluid.

In order to fully illustrate this utility of the novel products of this invention, the following data on the performance and evaluation of the product of Example 1, above, as a hydraulic foundation fluid, are given:

Consideration of the rubber swelling data on the individual members and the mixture referred to above indicated that the materials performed favorably. The diameter increase in the rubber brake seals noted was less than the tolerated .05″ after immersion in the liquid at 70° C. for 120 hours. The higher members of the series were particularly inert in this regard. It appears from the results on these and other materials that a critical ratio of carbon: ether oxygen: hydroxyl as well as structural configuration is operating in determining whether a compound attacks rubber.

The base fluid mixture meets the requirement that the hydraulic fluid must have a small change in viscosity over a wide temperature range and remain fluid at the low temperatures likely to be encountered in automotive or aircraft use, e.g., −50° F. The presence of 3-methoxybutanol and the lower members of the series serves as viscosity reducers at low temperatures and accommodates the incorporation of polymeric viscosity modifiers.

The hydraulic fluid, must, of course, possess sufficient lubricity under operating conditions in various times and extremes of temperature to place wear on the moving parts at a minimum. This condition is met by the presence of the higher members of the series which are viscous liquids and oil-like in consistency. The subject materials are free from gum formation which is a serious drawback to the use of lubricants of the like of castor oil and derived compounds.

The presence in a hydraulic brake fluid of low boiling diluents, either as solvents or decomposition products may result in vapor locks and is, therefore, to be avoided. The present trend in hydraulic fluids is towards materials which have higher boiling points. The lowest member of the ethyleneoxy series is 2-(3-methoxybutoxy)ethanol with a B.P. of 209° C. at atmospheric pressure. The presence of the higher members of the series increases the temperature at which the fluid boils and may be varied, depending on needs.

The wide solvent power of the above materials makes it possible to secure homogenous solutions on mixing with commercial hydraulic fluids.

The hygroscopicity of the ethylene oxide derivatives of 3-methoxybutanol is of a lower order than the glycols and polyethylene glycols in the same molecuar weight range, thus conferring an additiona advantage.

The water tolerance of these materials is excellent and easily meets specifications in this regard.

Specific examples are furnished to illustrate the use of the reaction products of ethylene oxide with 3-methoxy-1-butanol in a 1.5:1.0 ratio. The incorporation of buffer salts, anti-oxidants, rust inhibitors and viscosity modifiers is subject to wide variance depending on specifications. Those examples given below are designed to meet the specifications for the Chrysler Corporation Heavy Duty Hydraulic Brake Fluid (M.S. 3110).

Example III

To 94.7 parts of a mixture of adducts from the reaction of 1.5 moles of ethylene oxide and 1.0 moles of 3-methoxy-1-butanol, i.e., the product of Example I, above, was added 2.5 parts of ethyl glycol. The resulting mixture was stirred until it became a homogenous solution.

The viscosity of the composition at −40° F. was 990 cps. and the kinematic viscosity at 130° F. was 7.83 cs. A tube of this material was maintained at −40° F. for 6 days and at the end of this period, the tube was tilted from a vertical to a horizontal position. It was observed that the flow began immediately.

The composition was shown to tolerate 10% by weight of water and remained clear. The evaporation loss for a 48 hour period at 210° F. was 58%, far below the tolerated value of 80%.

A wheel cylinder cup was immersed in the above composition for 5 days at 158° F. and underwent an increase in base diameter of but 0.019", which is less than the tolerated .05" increase.

The corroding effects of the composition against strips of tinned iron, cold rolled steel, aluminum, cast iron, brass and copper were minimal.

The composition was miscible with all the commercial hydraulic brake fluids in popular use.

Example IV

To 100 parts of the same solution of the composition of Example III, was added 0.25 part of sodium nitrite dissolved in 2.25 parts of ethylene glycol.

The absolute viscosity of this composition at −40° F. was 1200 cps. and the kinematic viscosity at 130° F. was 8.63 cs.

The incorporation of the sodium nitrite improved the behavior of the liquid in regard to action on metals.

Example V

A mixture of 810 g. of 3,5-dimethoxy-1-hexanol and 2.5 g. powdered sodium hydroxide was reacted with a total of 220 g. of ethylene oxide at 120° C. at 20–30 p.s.i., the addition requiring 5–6 hours. This constitutes a ratio of 1:1 of 3,5-dimethoxy-1-hexanol and ethylene oxide. The product was neutralized by the addition of 1.5 g. 85% aqueous phosphoric acid, heated under vacuum to remove water and volatiles followed by filtration under suction to remove any insoluble salts.

The resulting oxyethylenated material was formulated into a hydraulic brake fluid in a fashion similar to that of Example III above.

Example VI

A mixture of 1,112 g. of 3,5,7,9-tetramethoxy-1-decanol and 3.0 g. powdered sodium hydroxide was reacted with a total of 264 g. of ethylene oxide at 120° C. at 20–30 p.s.i., the addition requiring 8 hours. This constitutes a ratio of 1.0:1.5 of 3,5,7,9-tetramethoxy-1-decanol and ethylene oxide.

The neutralization and isolation were patterned after Example V above.

Example VII

A mixture of 876 g. of 3-n-butoxy-1-butanol and 2.5 g. powdered sodium hydroxide was reacted with 528 g. of ethylene oxide at 120° C. at 20–30 p.s.i., the addition of the epoxide requiring 12 hours. This constitutes a ratio of 1.0:2.0 of 3-n-butoxy-1-butanol to ethylene oxide.

The neutralization was effected with the requisite amount of glacial acetic acid followed by heating in vacuum and suction filtration to remove any salts.

The material was completely miscible with water. Hydraulic brake fluids from the foregoing product, formulated in accordance with Example III, showed excellent performance as well as complete compatability with commercial brake fluids in current use.

Example VIII

A mixture of 524 g. of 3,5,7-triethoxy-1-octanol and 2.0 g. powdered sodium hydroxide was reacted with 176 g. of ethylene oxide at 120° C. at 20–30 p.s.i., the addition of the epoxide requiring 4 hours. This constitutes a ratio of 1.0:2.0 of 3,5,7-triethoxy-1-octanol to ethylene oxide.

The neutralization of the caustic and isolation was patterned after example V above.

The base material 3,5,7-triethoxy-1-octanol was only slightly soluble in water and therefore of no applicability per se in hydrauic fluids requiring complete water mismibility. The mixture of ethyleneoxy derivatives of this example was complete miscible with water.

A heavy duty hydraulic brake fluid was formulated in accordance with Example III.

It is to be understood that the foregoing examples are illustrative of preferred embodiments of invention but various changes may be made therein. Thus by selection of the particular alkoxy alcohol employed as a starting material and also of the particular alkylene oxide employed and the relative amount thereof, the specific properties of the products which are obtained can be varied so as in affect to "tailor make" products particularly suited for specific uses and applications.

Thus the use of higher members of the 3,5,$x$-series of polyalkoxyalkanols will yield a product of lower volatility, greater lubricity and greater anti-wear properties than the lower members of this series. Also by use of alkylene oxides having a greater molecular weight than ethylene oxide, the production of products of lesser water solubility but greater oil solubility is promoted. It is also, of course, possible to employ mixtures of alkylene oxides, or, if desired, to first react the 3,5,$x$-polyalkoxyalkanol with one alkylene oxide—say propylene or butylene oxide— until several moles thereof have been added, and then react, the thus obtained product, with a different oxide such as ethylene oxide. Such alkylene oxides can be reacted with the polyalkoxyalkanol in the same manner as ethylene oxide illustrated in the foregoing examples.

The alkylene oxides suitable for use in the present invention may be characterized as vicinal epoxides represented by the following formula:

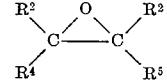

wherein the radicals designated as $R^2$, $R^3$, $R^4$ and $R^5$ individually can be hydrogen and alkyl, alkenyl, aryloxyalkyl, or the like groups, and two of the radicals designated as $R^2$, $R^3$, $R^4$ and $R^5$ may be taken together to form a cycloalkyl group, preferably wherein the said groups have from 1 to 10 carbon atoms.

Representative groups of vicinal epoxides which can be employed include, among others, the alkylene oxides, the epoxyalkenes, the aryloxy-substituted alkylene oxides, the epoxycycloalkenes, and the like which preferably have from 2 to 12 carbon atoms. Specific examples of vicinal epoxides which can be employed include, among others, ethylene oxide, 1,2-epoxypropane, the epoxybutanes, 3,4-epoxy-1-butene, the epoxypentanes, 3,4-epoxy-1-pentene, the epoxyhexanes, the epoxyheptanes, the epoxyoctanes, the epoxynonanes, the epoxydecanes, the epoxydodecanes, phenyl glycidyl ether, tolyl glycidyl ether, xylyl glycidyl ether and other alkyl-substituted phenyl glycidyl ethers, epoxycyclohexane and alkyl-substituted epoxycyclohexanes, epoxycyclopentane and alkyl-substituted epoxycyclopentanes, 2,3-epoxybicyclo (2.2.1) heptane, or the like.

I claim:
1. Compounds of the formula

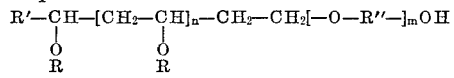

wherein R and R' each independently represent a lower alkyl radical R" represents the residue of a vicinal epoxide and has the formula

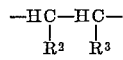

wherein $R^2$ and $R^3$ each independently represent a member of the group consisting of hydrogen, lower alkyl, phenyl and $R^2$ and $R^3$ taken together may represent an alkylene group forming with the carbons of the epoxy residue a cycloalkyl moiety which contains from 1 to 10 carbon atoms; $n$ represents an integer of zero to 30 and $m$ represents an integer of 1 to 100.

2. Compounds of the formula

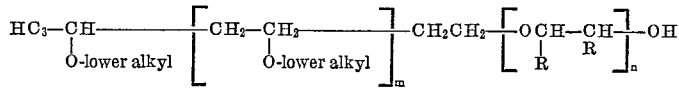

wherein one R represents hydrogen and the other R represents a member of the group consisting of hydrogen and methyl, $m$ represents an integer of from 0 to 5, and $n$ represents an integer of from 1 to 5.

3. Compounds of the formula

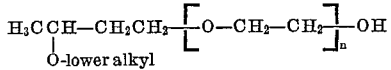

wherein $n$ represents an integer of 1 to 5.

4. Compounds of the formula

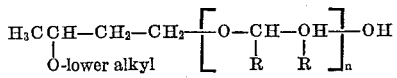

wherein one R represents methyl and the other R represents hydrogen, and $n$ represents an integer of from 1 to 5.

References Cited
UNITED STATES PATENTS

| | | | |
|---|---|---|---|
| 1,970,578 | 8/1934 | Schoeller et al. | 260—614 X |
| 2,618,663 | 11/1952 | Glickman | 260—615 |
| 2,736,709 | 2/1956 | Glickman | 252—74 |
| 2,782,240 | 2/1957 | Hefner et al. | 260—615 X |
| 2,983,763 | 5/1961 | Krause | 260—615 X |
| 3,030,426 | 4/1962 | Moseley et al. | 260—615 |

BERNARD HELFIN, *Primary Examiner.*

H. T. MARS, *Assistant Examiner.*

UNITED STATES PATENT OFFICE
CERTIFICATE OF CORRECTION

Patent No. 3,398,201                                                   August 20, 1968

Samuel A. Glickman

It is certified that error appears in the above identified patent and that said Letters Patent are hereby corrected as shown below:

Column 3, line 6, "or" should read -- of --. Column 6, lines 12 and 13, "mismibility" should read -- miscibility --; line 14, "complete" should read -- completely --; line 45, in the formula, upper right-hand portion thereof, "$R^2$" should read -- $R^3$ --.

Signed and sealed this 10th day of March 1970.

(SEAL)
Attest:

Edward M. Fletcher, Jr.                                  WILLIAM E. SCHUYLER, JR.
Attesting Officer                                                 Commissioner of Patents